Oct. 21, 1952 E. J. WADE 2,615,154
AUTOMATIC STEERING SYSTEM
Filed Sept. 2, 1950

Inventor:
Elmer J. Wade,
by Claude A. Mott
His Attorney.

Patented Oct. 21, 1952

2,615,154

UNITED STATES PATENT OFFICE 2,615,154

AUTOMATIC STEERING SYSTEM

Elmer J. Wade, Schenectady, N. Y., assignor to General Electric Company, a corporation of New York Application September 2, 1950, Serial No. 182,991

2 Claims. (Cl. 318—489)

This invention relates to automatic steering systems and more particularly to a system having weather helm compensation.

In my Patent 2,256,875—granted September 23, 1941, titled Automatic Steering System, there is disclosed a system having compass means responsive to deviation of a craft from a predetermined course for energizing a driving motor to operate the craft's rudder. Deflection of the rudder causes a feedback to the compass whereby the amount of rudder movement becomes a function of craft deviation from the course. Such an arrangement has a characteristic common to all closed circuit control systems which is commonly known as "droop" or regulation This results in a change of the course steered depending upon weather conditions, since a condition which requires a constant rudder deflection in one direction due to cross winds, for example, will result in a steady feedback to the compass in which case the compass will steer the craft on a course which corresponds to the resultant of the earth's field and the field which is created by the feedback.

It is an object of my invention to provide an improved steering system which will permit a craft to pursue a preset course irrespective of any need for a constant rudder deflection as may be required by weather conditions.

It is a further object of my invention to incorporate in an automatic steering system of the compass-controlled, feed-back type, apparatus which will tend to gradually reduce to zero the feedback resulting from a steady rudder deflection.

According to my invention, I provide a steering system having a compensating means which is placed between the rudder and the device which controls compass feedback as a function of rudder movement. This compensating means is operated upon by the rudder and acts to average out the steering movement of the feedback control device, thus allowing the feedback to be reduced to zero over a period of time, while at the same time permitting the rudder to have an off-course deflection to compensate for weather helm.

Figure 1:
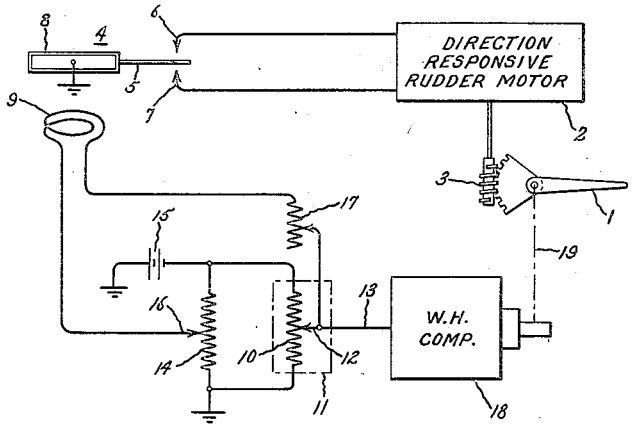
Figure 2:
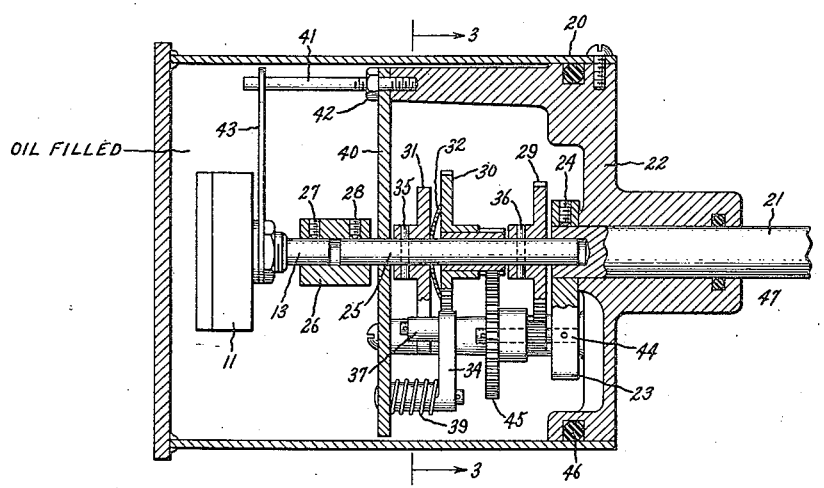
Figure 3:
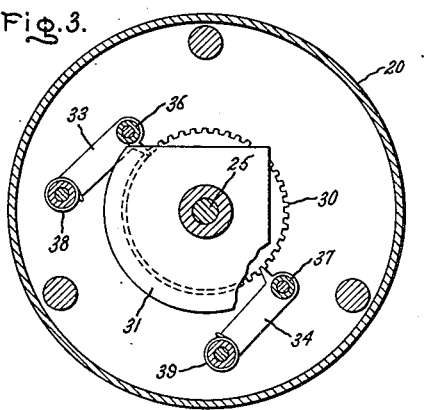

The invention will be more fully understood by referring now to the accompanying drawing wherein:

Fig. 1 is a semi-schematic representation of the components of my automatic steering system, Fig. 2 is a side elevational view, partly in section, of a component shown in Fig. 1; and Fig. 3 is a transverse cross sectional view of the component shown at Fig. 2 taken along the line 3—3 of Fig. 2.

Referring now to Fig. 1, the rudder 1 of the craft upon which my steering system is mounted is driven by a suitable driving means illustrated as servomotor 2. The servomotor 2 rotates the worm gear 3 in one direction or the other in response to deviation of the craft from its course as detected by a compass 4.

The compass is provided with a movable contact 5 mounted on the compass magnet and a pair of cooperating contacts that are normally stationary but may be moved by means of a course setting device, not shown, to a position in azimuth such that when the craft is on the desired course, the movable contact 5 occupies a position between the two contacts 6 and 7 and does not engage either of them.

Preferably the compass consists of a magnet 8 which is pivotally mounted for rotation in bearings, not shown, and is suitably damped in any well known manner.

The magnet is influenced by the magnetic field of a bias coil 9, the current in which is varied by a potentiometer resistor 10 having an enclosure 11 and a movable brush contact 12 actuated by a shaft 13. This bias coil supplies a magnetic flux at right angles to the horizontal component of the earth's magnetic field, and the magnitude of this flux is proportional to the deflection of the rudder.

Potentiometers 10 and 14 constitute a bridge that is energized from battery 15. The circuit is traced from the negative terminal of battery 15, resistors 10 and 14 in parallel to ground and the negative terminal of the battery. The terminals of bias coil 9 are connected to movable brush contacts 12 and 16 which occupy equipotential points on the resistors 10 and 14 when the craft is following its established course. A variable resistor 17 is incorporated into the bias coil circuit in order to permit adjusting for rudder sensitivity.

During good cruising weather, when there are no extraneous forces, such as sail, towing, dragging, cross winds or heavy seas affecting the automatic course, the rudder 1 may be connected to operate the shaft 13 directly.

When forces such as those above mentioned begin to appear, provision must be made for shifting the normal position of the rudder 1 so as to offset the forces on the craft and to avoid resetting the automatic course slightly to accommodate the varying weather conditions. This shift in rudder position for this purpose is known as "weather helm" and the means which I have provided for making this adjustment in the rudder position without affecting the preset course of the craft may be referred to as a weather helm compensator, and is illustrated in Fig. 1 by the diagrammatic representation 18 which is shown as being connected between the potentiometer shaft 13 and a driving shaft 19 connected to the rudder 1.

Before proceeding with a description of my weather helm compensator 18, the details of which are disclosed in Figs. 2 and 3, let us examine the normal operation of my automatic steering system when not equipped with the compensator 18. Thus, we can assume that the shaft 19 drives the shaft 13 directly so that the brush 12 will be driven from its equipotential position in direct proportion to the movement of the rudder 1.

Suppose the craft deviates from its course in such a direction that the contacts 5 and 7 are closed. This causes the servomotor 2 to be energized whereby the rudder 1 will be operated in a direction to oppose the deviation. Without the compensator 18, movement of the rudder will cause the brush 12 to depart from its equipotential position, thus causing a current to be supplied from the bridge to the bias coil 9 that is proportional to the deflection of the rudder 1. The direction of the flux of bias coil 9 is such as to tend to cause the contacts 5 and 7 to open. The contacts 5 and 7 will not necessarily open immediately, however, because of the various time constants, and, therefore, craft deviation will continue to increase slightly, thus tending to prevent the contact 5 from returning to the neutral position at once. When the influence of the bias coil 9 produces a moment which is equal and opposite to that of the earth's field, the contact 5 will return to its neutral position. As a result, the servomotor 2 will be deenergized and movement of the rudder 1 will cease.

It will be seen that with the above described system, an additional rudder deflection would be necessary to offset any extraneous forces on the craft such as those caused by weather and that a condition which requires a constant rudder deflection in one direction will result in a steady current in coil 9 which will add a component of flux at right angles to the earth's field. The compass would then steer the craft on a course which depends on the resultant field. This error may be corrected according to my invention by a device which would keep potentiometer brush 12 at the center of its range, regardless of the biasing effects of weather conditions.

Looking now at Fig. 2, there is shown the combination of the potentiometer 11 with the compensator 18, both being contained in a single enclosure 20. The device shown comprises a drive shaft 21 which is actuated by the rudder 1. This driving member 21 is journaled for rotation within a casting 22 and the left end of the drive member 21 is prevented from moving to the right by an arm 23 which hangs down in a position normal to the drive member 21. The arm 23 is secured to the drive member 21 by a set screw 24.

Recessed for rotation within the left end of drive member 21 is a short shaft 25 which is connected at its left end by coupling member 26, having two set screws, 27 and 28. Coaxially mounted on shaft 25 are two gears 29 and 30 as well as a cam 31 (more clearly shown in Fig 3).

A spring washer 32 provides a slip-fit connection between the gear 30 and the cam 31. Two pawls 33 and 34, only one of which is shown in Fig. 2, are made to engage the gear 30 when the cam 31 is in its normal position as shown in Fig. 3. The cam 31 is held to the shaft 25 by a pin 35. Another pin, 36, likewise secures gear 29 to the central shaft 25. Mounted on the pawls 33 and 34 are two rollers 36 and 37 respectively (only one of which is shown in Fig. 2) and the cam 31 makes contact with these rollers when rotated in either direction to disengage one of the pawls from the gear 30. Coil springs 38 and 39 maintain a slight tension on the pawls in order that they will always engage the teeth of gear 30 unless prevented from doing so by the cam 31. The pawls 33 and 34 may be pivotally affixed in any suitable manner to a supporting plate 40 which is secured to the casting 22 by a nut 41 and bolt 42, which is also adapted to support the bracket 43 to which the potentiometer 11 is affixed.

The arm 23 has a short shaft 44 pinned thereto, at its lower extremity, the shaft 44 being parallel to the central shaft 25, but not coaxial therewith. This shaft acts as a bearing about which the gear 45 rotates, and the gear 45 is adapted to engage the gears 29 and 30.

The enclosure 20 is oil-filled and sealed against leakage by two seals preferably of the O type, at 46 and 47.

Fig. 3 is merely a detail showing a cross sectional view along the lines III—III of Fig. 2 so as to better illustrate the action of the pawls 33 and 34. The view shown in Fig. 3 is believed to be explanatory in view of the description of the corresponding items in Fig. 2.

The operation of the device illustrated in Fig. 2 will now be explained in order to better set forth its operation in the loop of my automatic steering system as shown in Fig. 1.

Assume that the rudder is turning in a direction which will rotate the shaft 21 clockwise looking at the driving end. It is further assumed that both pawls 33 and 34 are engaged with the gear 30 and that the cam 31 is in its neutral position. Now, it will be apparent that since the gear 30 is prevented from turning initially, then the left end of gear 45 will start to walk up the right end of gear 30 due to the counterclockwise motion of the shaft 44 in an orbit about the axis of central shaft 25. As soon as this motion begins, however, the right hand end of gear 45, being engaged to gear 29, will gradually take gear 29 with it. It will be obvious from the gear ratios shown, however, that while the gear 29 moves in the same direction as the driving shaft 21, it will do so at a reduced speed. Since gear 29 is pinned to the same shaft which carries the cam 31, it will be evident that the cam 31 will lift the pawl 34 from engagement with the gear 30, but will not affect the engaged status of pawl 33 with the gear 30. It will also be apparent that as the gear 29 rotates at a reduced speed, it will in turn rotate the shaft 13 of the potentiometer 11, since the shaft 13 is directly coupled to the gear 29. Thus, as the driving shaft 21 continues to rotate in a clockwise direction, the shaft 13 of potentiometer 11 also rotates in a clockwise direction, but at a reduced speed.

Assume now that the driving member 21 has reached the end of its clockwise movement and begins to return in a counterclockwise direction. It will now be seen that the spring washer 32 operates to lock cam 31 and gear 30 together, and, therefore, since pawl 34 is held from engaging the gear 30 by virtue of the moved position of the cam 31, the entire gear train will move as a unit as if the central shaft 25 were locked directly to the driving shaft 21. This integral movement will continue until the cam 31 reaches its neutral position, at which time the pawl 34 will again engage the gear 30. Until such time as this occurs, however, it will be clear that the shaft 13 of potentiometer 11 will have been returned a greater distance than it was advanced in the clockwise position, depending upon the ratio of the gears.

If the driving shaft 21 continues on beyond the neutral position, this operation will repeat itself in the reverse direction.

Due to the above described action, it will now be apparent that as the craft's rudder oscillates about an off course position in making correction to offset the effects of extraneous forces operating to deflect the craft from its predetermined course, it will tend to return the brush 12 of the potentiometer to its neutral position regardless of the average position of the rudder. In this position, the current in the bias coil 9 will average to zero and consequently will have no effect on the course. Accordingly, it will be seen that I have provided a steering system into which there is incorporated a weather helm compensation means which materially improves the course following properties of a craft under conditions of adverse weather.

While a particular embodiment of my invention has been illustrated and described, modifications thereof will readily occur to those skilled in the art. It should be understood, therefore, that the invention is not limited to the particular arrangement disclosed, but that the appended claims are intended to cover all modifications which do not depart from the true spirit and scope of the invention.

What I claim as new and desire to secure by Letters Patent of the United States is:

1. In an automatic steering system for a dirigible craft including a rudder, a reversible rudder driving motor, a magnetic compass adapted when mounted upon a craft to have a normal null position with respect to the craft, means responsive to deviation of said compass from said null position for energizing said motor for movement in a direction determined by the direction of said deviation, electro-magnetic flux generating means disposed to influence said compass, means including a potentiometer actuated by said motor for energizing said flux generating means in an amount proportional to displacement of said motor from the predetermined normal position and in a sense to restore said compass to said null position, said predetermined normal motor position corresponding to a predetermined normal rudder position and a null potentiometer position and being variable in accordance with external forces acting upon the craft, and reversible coupling means interposed between said motor and said potentiometer, said coupling means having unequal forward and reverse driving ratios thereby automatically to determine said predetermined normal rudder position in accordance with said external forces while maintaining said potentometer in an average null postion.

2. In an automatic steering system for a dirigible craft including a rudder, a reversible rudder driving motor, a magnetic compass adapted when mounted upon a craft to have a normal null position with respect to the craft, means responsive to deviation of said compass from said null position for energizing said motor for movement in a direction determined by the direction of said deviation, electromagnetic flux generating means disposed to influence said compass, means including a potentiometer actuated by said motor for energizing said flux generating means in an amount proportional to displacement of said motor from a predetermined normal position and in a sense to restore said compass to said null position, said predetermined normal motor position corresponding to a predetermined normal rudder position and a null potentiometer position and being variable in accordance with external forces acting upon the craft, and reversible gear coupling means interposed between said motor and said potentiometer, said gear coupling means having a driving ratio upon movement of said motor away from a streamlined rudder position higher than upon movement of said motor toward a streamlined rudder position, whereby said potentiometer is automatically maintained in an average null position independently of variation in the normal rudder position.

ELMER J. WADE.

REFERENCES CITED

The following references are of record in the file of this patent:

UNITED STATES PATENTS

| Number | Name | Date |
| --- | --- | --- |
| 2,256,875 | Wade | Sept. 23, 1941 |
| 2,370,580 | Pyne et al. | Feb. 27, 1945 |
| 2,405,015 | Carlson | July 30, 1946 |